Figure 1:
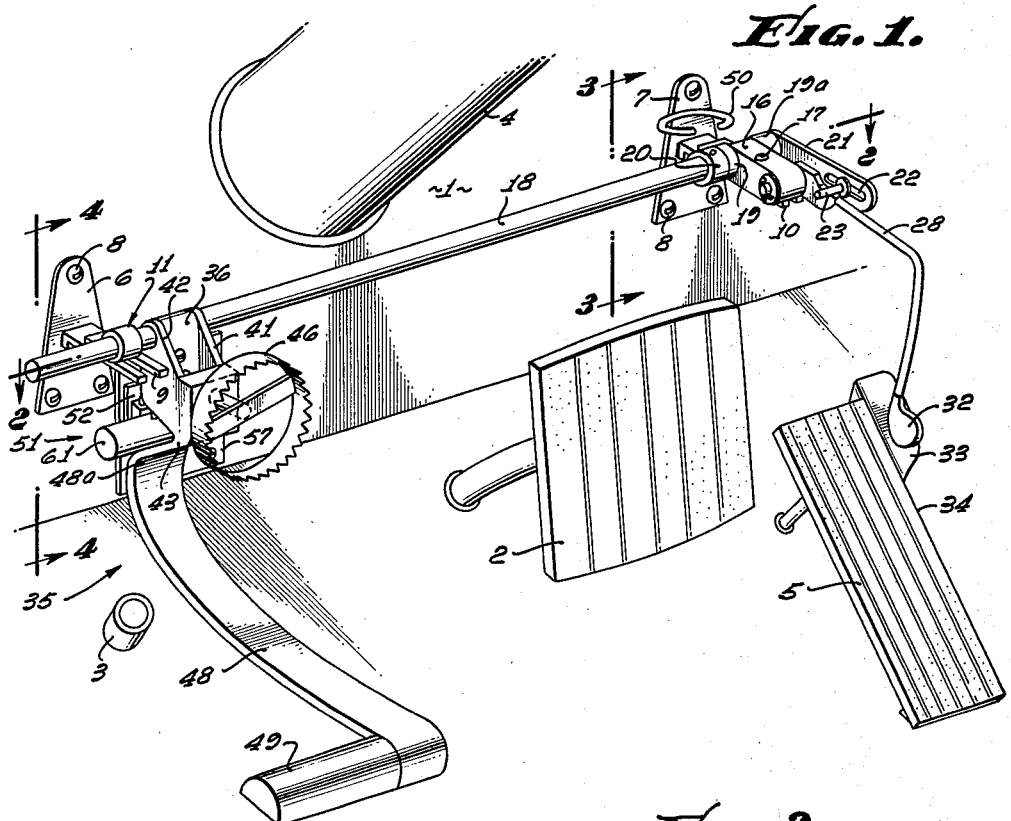

Feb. 9, 1960 M. K. KING 2,924,119
SPEED CONTROL DEVICE

Filed May 7, 1956 2 Sheets-Sheet 1

INVENTOR,
MARVIN K. KING,
BY
Calvin Brown
ATTORNEY.

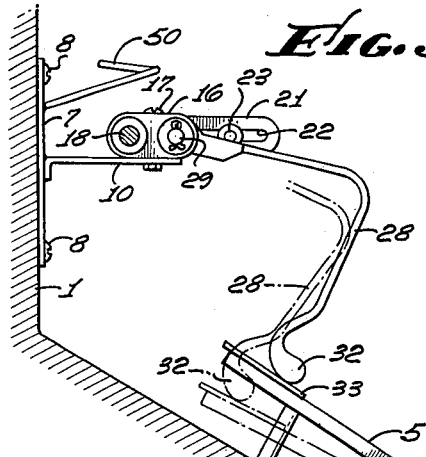
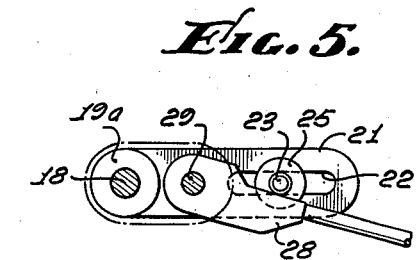
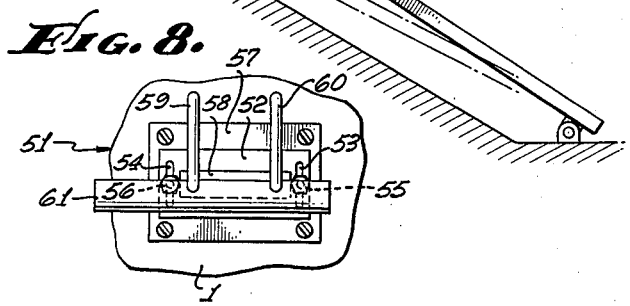
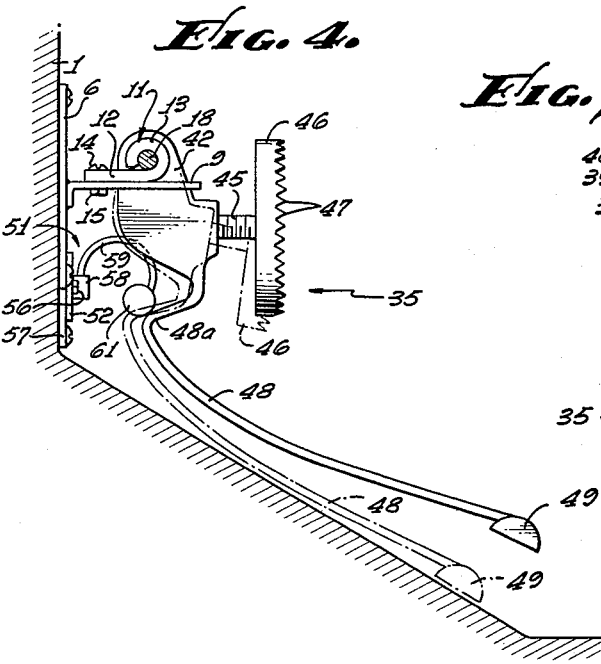
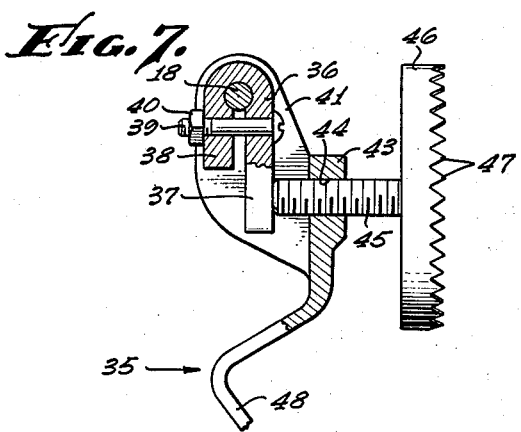

ated Feb. 9, 1960

2,924,119
SPEED CONTROL DEVICE
Marvin K. King, Elsinore, Calif.

Application May 7, 1956, Serial No. 583,037

5 Claims. (Cl. 74—562.5)

The present invention relates to speed control devices for automobiles and trucks, and has for an object a device adapted to operate in conjunction with the accelerator pedal normally provided in such vehicles.

It is a known fact that over long driving periods, the foot and leg become tired from depressing the main accelerator pedal to control the speed of the vehicle. My invention contemplates an auxiliary accelerator pedal which may be pre-set or set during a driving of the vehicle in such a manner that a normally constant speed on a level highway may be maintained. Thus, for one embodiment of my invention, I provide a pedal which may be controlled as to depression by the left foot of the driver. This particular pedal may be preset so that when depressed to a resistance to movement point, the vehicle will normally maintain a constant driving speed or cruising speed when on a level highway.

A further object of the invention consists in so relating an auxiliary accelerator pedal, which may be depressed by the left foot, that the right or main accelerator may be operated by the right foot for all vehicle speeds beyond normal driving speed or cruising speed as preset for the left accelerator pedal.

With relation to the foregoing object, if the vehicle has been pre-set for a cruising or normal speed of 50 miles per hour, and it is desired to maintain said speed if a hill is encountered, or for passing purposes, the right accelerator pedal may be depressed to either maintain the cruising speed or to exceed the same. Or, if the driver so desires, the left foot may move the auxiliary pedal beyond the resistance to movement point to accelerate the vehicle.

A further object of my invention is to provide a speed control operating in conjunction with the main accelerator pedal which is easily removed from one vehicle and installed in another vehicle, within a minimum of time and effort.

A further object of my invention is a speed control which may be brought into position for operation by a vehicle driver or moved easily and quickly to a neutral position against the fire wall of the vehicle.

Other objects and advantages of the invention consist in a speed control of simple construction, foolproof in operation, inexpensive in cost of manufacture and generally superior to devices now known to the inventor.

With the above mentioned and other objects in view, the invention consists in the novel and useful provision, formation, construction, association, and relative arrangement of parts, members and features, all as shown in certain embodiments in the accompanying drawings, described generally, and more particularly pointed out in the claims.

Figure 2:
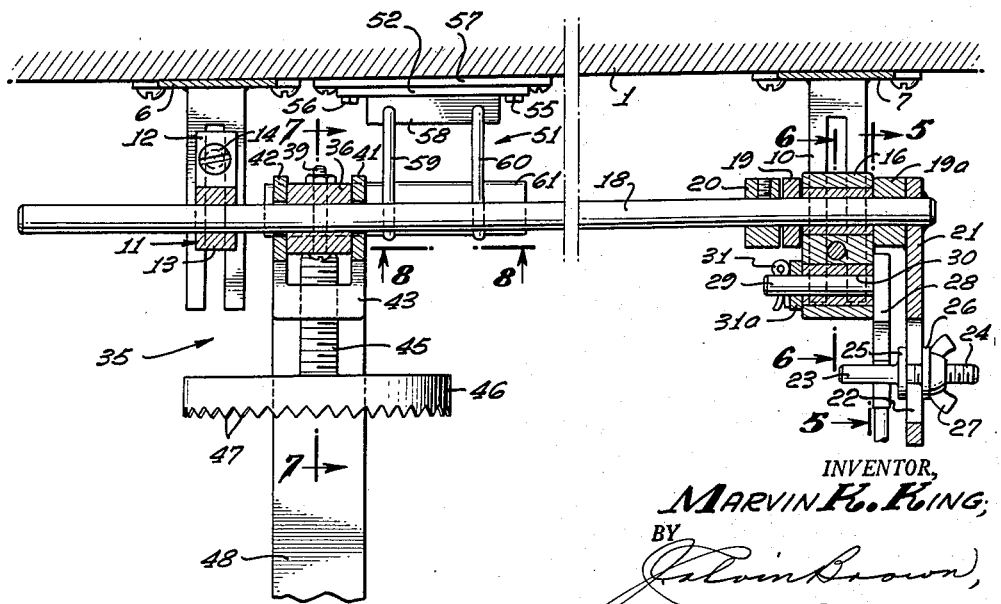

In the drawings:

Figure 1 is a fragmentary perspective view of the speed control assembly mounted within a vehicle forwardly of the driver's compartment, Figure 2 is a fragmentary, partially sectional view, on the line 2—2 of Figure 1, and on an enlarged scale, Figure 3 is a fragmentary sectional view on the line 3—3 of Figure 1, and on an enlarged scale, Figure 4 is a fragmentary sectional view on the line 4—4 of Figure 1, and on an enlarged scale, Figure 5 is a fragmentary view on an enlarged scale, and on the line 5—5 of Figure 2, Figure 6 is a fragmentary view, partly in section, on an enlarged scale, and taken on the line 6—6 of Figure 2, Figure 7 is a fragmentary sectional view on the line 7—7 of Figure 2, and, Figure 8 is an elevation of the means for imposing a resistance to movement of the auxiliary pedal and looking in the direction of the arrows 8—8 of Figure 2.

Referring now with particularity to the drawings, I have shown my speed control device as an entirety in Figure 1 mounted within the driver's compartment and secured to the fire wall 1 of the vehicle. 2 is the pedal for controlling brake movement, and 3 is a dimmer switch for the headlights. The usual steering wheel post is shown at 4. The main accelerator pedal is shown at 5, and controls the rate of flow of combustible liquid to the carburetor of the vehicle. The elements just mentioned are common in most automotive vehicles.

I propose to operate my improved speed control device in conjunction with the main accelerator pedal 5. To accomplish this, I provide a pair of fixtures 6 and 7 which are attached to the fire wall 1 by any appropriate means, such as by bolts or screws 8, and which fixtures include projecting bifurcated members 9 and 10. The bifurcated members are identical in construction. Carried by the bifurcated member 9 is a bearing 11 of the type best depicted in Figure 4, which bearing includes a strap 12, one end of which is curvedly bent, as shown at 13. The strap 12 is transversely bored to permit passage therethrough of a bolt 14 carrying a nut 15. The arrangement is such that the strap 12 rests on top of the bifurcated member 9, the bolt being passed between the furcations, and the nut, when tightened on the bolt, secures the bearing member in position. The bifurcated member 10 carries a bearing member 16, which is removably carried on the furcations by a bolt and nut, designated generally as 17, in the same manner that the bearing member 11 is held to the member 9. Extending through and between the bearing members 11 and 16 is an elongated shaft 18 and said shaft is free to rotate within the said bearing members. Longitudinal movement of the shaft within the bearing member is restrained by means of collars 19 and 19ª on each side of said bearing member 16 and by a lock collar 20. In this respect, the shaft 18 is provided with an arm 21 adjacent collar 19ª, this arm being substantially in right angular relationship to the axis of the shaft and fixed to said shaft either by welding or by set screws. The arm 21 is provided with an elongated, longitudinally extending, transverse slot 22, and said arm adjustably carries in said slot 22 a transverse projecting pin 23. As shown in Figure 2, pin 23 is provided with a threaded portion 24, and carries a pair of washers 25 and 26 arranged on opposite sides of the said arm 21, the washer 25 being fixed to said pin, as by welding or otherwise, and the screw-threads carry a wing nut 27, whereby the said pin may be adjusted as to position within the said slot 22. The unthreaded area of the pin 23 overlies an arm designated generally as 28, which arm at one end is provided with a transverse pin 29, which pin is passed through a transverse bore 30 in bearing member 16 and locked to said bearing member in any appropriate manner, such as by a cotter pin 31 passed transversely through the pin 29 and engaging a washer 31ª. The arm 28 is bent so as to have two portions in angular relationship, as shown in Figures 1 and 3. The outermost end of said arm is provided with a club type gooseneck foot portion 32, the edge of which is curved for slide movement upon a plate 33 projecting laterally from the main accelerator pedal along one edge 34 thereof and of sufficient length to allow full slide movement of the foot portion 32 thereon, as for instance illustrated in Figure 3 for two positions of said foot portion.

Adjacent the fixture 6 and secured to the shaft 18 is the cruising or speed control pedal assembly 35. The assembly 35 includes a clamp 36 comprising, in the present instance, a U-bent strap adapted to engage the shaft 18, in the manner shown in Figure 7. The strap ends 37 and 38 are transversely bored to receive a bolt 39, the threads of the bolt carrying a nut 40, whereby the strap ends 37 and 38 may clamp the said shaft. As shown, the strap end 37 has greater length than end 38. The strap is positioned between spaced sides 41 and 42 of a swing block 43, the said sides being bored transversely for reception on the shaft 18. The front face of block 43 is provided with a transverse threaded bore 44 for reception of a threaded shank 45 for wheel 46. The end of said shank bears against the outer face of the strap member 37 (Figure 7). In the present embodiment of the invention, I provide the said wheel with an annular row of edge teeth 47, or I may provide a rubber ring for the said wheel so that the said wheel may be easily turned, either by the foot or by the hand. The block 43 is provided with a depending elongated curved arm 48 forming an element of assembly 35. The arm connection with block 43 is of Z form, as shown at 48ª. The extremity of arm 48 carries a transverse pedal piece 49.

The fixture 7 carries a projecting curved spring 50 which lies within the path of movement of the arm 28 so that if the operator lifts the arm 28 upwardly, the spring will engage the arm 28 and hold the auxiliary speed control upwardly against the fire wall of the vehicle, in the event the operator does not wish to use the assembly.

Secured to the firewall 1 is means 51 for imposing a resistance to downward movement of the arm 48, when a given point is reached in its movement. Means 51 includes a plate 52 provided with slots 53 and 54 through which are passed adjusting bolts 55 and 56 projecting from plate 57, which plate is fastened to the firewall (see Figure 8). A block 58 is secured to plate 52 and a pair of spaced apart projecting curved spring arms 59 and 60 have one end of each thereof secured to block 58, while the opposite ends carry therebetween an elongated cylindrical member 61. Member 61 is directly behind the Z-shaped bend 48ª (see Figures 1 and 4) of arm 48.

The operation, uses and advantages of the invention just described are as follows:

Assume that the driver of the vehicle does not wish to exceed a speed limit which may be between 50 to 55 miles per hour when driving on a level highway. Accordingly, the driver will depress the main accelerator pedal 5 while driving on a level highway to bring the vehicle to a given selected speed, whereupon the driver may, by the toe of his shoe, rotate the wheel 46 to bring the Z-shaped portion 48ª into engagement with the cylindrical member 61. The arm 48 should be elevated above the floor boards, as shown in the full line position therefor in Figure 4. This may initially require some adjustment of the plate 52 relative to plate 57 through the medium of bolts 55 and 56 to bring the cylinder 61 into proper position.

For ordinary driving at a selected speed, the driver may use either the main accelerator pedal or the auxiliary pedal. After the arm 48 has been properly adjusted for a given speed, the driver may depress the arm 48 until resistance is encountered. This resistance, as previously stated, is caused by the cylinder 61 engaging the bight of the Z-shaped portion of said arm. The driver instinctively knows that this is the point at which a given speed will be maintained on a level highway. However, if the driver desires to accelerate the speed of the vehicle beyond the selected speed, which might occur in the desire to pass a vehicle, or if a hill is encountered, the driver may further depress the arm 48 to, say, the floor boards, as indicated by the dotted line position for said arm and pedal in Figure 4. The arm will immediately return to the full line position of Figure 4 after pressure is released therefrom, due to the action of the springs 59 and 60. Quite obviously, the springs 59 and 60 may be of any strength desired to accomplish the objects of this particular portion of my invention. I have assumed, of course, that the driver is using his left foot for driving purposes. If he is using his right foot, then no problem of resistance is encountered, so far as depression of the pedal 5 is concerned.

The driver may re-adjust the auxiliary arm or accelerator pedal 48 by turning the wheel 46 which raises or lowers the auxiliary pedal or arm 48 due to engagement of the stud 45 with clamp 36 which is fixedly attached to the shaft 18. The adjustment allowed the pin 23 also will aid in the control of the depression of the accelerator pedal 5 when the secondary or auxiliary pedal or arm 48 is depressed. It is perhaps unnecessary to state that the main pedal 5 is held in an upward position by means of a coil spring, usually under the floor bords and associated with the linkage connected with the carburetor. The tension of this spring is sufficient to handle swinging movement of the auxiliary control assembly.

When driving at night, the auxiliary accelerator pedal or arm is conveniently positioned adjacent the dimmer switch 3 so that the driver, without lifting his foot from said auxiliary accelerator pedal 49, may operate the switch 3. If the device is to be placed in inoperative position, the arm 28 may be swung upwardly, which will carry with it the clamp 36 and the arm 21, and the pedal 48, the arm 28 frictionally engaging the said spring 50 so that all of said parts are out of position adjacent the fire wall.

If transfer of the mechanism is desired, the bolts and nuts shown at 14 and 15, in Figure 4, and at 17, may be released, and the entire assembly removed from the bifurcated members 9 and 10 for re-installation in another vehicle equipped with fixtures like 6 and 7.

I claim:

1. The combination in a motor vehicle having a fire wall, floor boards and a main accelerator pedal for controlling the speed of the vehicle, of an auxiliary accelerator pedal spaced laterally from the main accelerator pedal for actuation by the left foot of the driver of the vehicle, an elongated shaft secured to the fire wall of the vehicle, means loosely mounting said auxiliary accelerator pedal on said shaft, adjustment means between the shaft and said auxiliary accelerator pedal for adjusting the angular position of the auxiliary accelerator pedal on the shaft, a lever secured to the shaft, a swing arm engaging the main accelerator pedal, and means between the said lever and the said swing arm for unidirectionally engaging said swing arm when the shaft is rotated in one direction.

2. The device as set forth in claim 1, characterized in that means is provided for the auxiliary accelerator pedal for imparting resistance to movement thereof after the auxiliary pedal has been depressed a predetermined amount.

3. The combination in a motor vehicle having a fire wall, floor boards, and a main accelerator pedal for controlling the speed of the vehicle, of aligned fixtures secured to said fire wall, axially aligned bearings detachably secured to said fixtures, an elongated shaft passed through said bearings, a lever fixedly secured to said shaft, an arm, means for swingingly mounting one end of said arm to a fixture, adjustable means between the lever and said arm for moving the arm when the shaft is rotated in one direction, the opposite end of said arm being in free engagement with the main accelerator pedal, an auxiliary accelerator pedal, means freely mounting said auxiliary accelerator pedal on said shaft, a threaded stud passed through one end of said auxiliary accelerator pedal, a wheel carried by said stud, and means fixed to said shaft for engagement with an end of said stud whereby rotation of the wheel swings the auxiliary accelerator pedal so as to raise or lower the auxiliary pedal.

4. The device as set forth in claim 3, characterized in that spring means is adjustably mounted on said fire wall to the rear of the auxiliary accelerator pedal for engagement with said auxiliary pedal when the auxiliary pedal has been depressed a given amount to impose a continuous resistance to further movement of the auxiliary pedal beyond said point.

5. The device as set forth in claim 1, characterized in that means is provided for frictionally engaging the mounting means for said swing arm to hold the auxiliary accelerator pedal and the said swing arm against the fire wall when the shaft is rotated in one direction.

References Cited in the file of this patent

UNITED STATES PATENTS

| | | |
|---|---|---|
| 1,889,685 | McIntyre | Nov. 29, 1932 |
| 2,084,932 | Allen | June 22, 1937 |
| 2,163,571 | Brock | June 27, 1939 |
| 2,187,068 | Adamic | June 16, 1940 |
| 2,332,064 | Duffy | Oct. 19, 1943 |
| 2,645,948 | Beckman | July 21, 1953 |
| 2,732,729 | Joyce | Jan. 31, 1956 |

FOREIGN PATENTS

| | | |
|---|---|---|
| 490,383 | Canada | Feb. 10, 1953 |